United States Patent [19]
Pollack

[11] 3,750,474
[45] Aug. 7, 1973

[54] ALTITUDE ENCODER
[75] Inventor: Dale Pollack, Clearwater, Fla.
[73] Assignee: Aerosonic Corporation, Clearwater, Fla.
[22] Filed: June 28, 1971
[21] Appl. No.: 153,478

[52] U.S. Cl. ................................. 73/386, 73/398 R
[51] Int. Cl. ........................... G01l 7/12, G01l 9/10
[58] Field of Search .................. 73/386, 387, 398 R, 73/398 C; 331/65

[56] References Cited
UNITED STATES PATENTS
3,513,708  5/1970  Springer ............................... 73/384
3,625,060  6/1970  McCallion ............................ 73/386

Primary Examiner—Donald O. Woodiel
Attorney—Stefan M. Stein

[57] ABSTRACT

An altitude encoder which provides a digital readout from a barometric sensor comprised of an aneroid bellows linked mechanically with a means to control the frequency of a sense oscillator. The sense oscillator produces a frequency proportional to altitude which constitutes an output signal to a counter. The output of a counter represents altitude and is stored for readout or fed into a transponder for transmission to the ground.

18 Claims, 5 Drawing Figures

ALTITUDE ENCODER

BACKGROUND OF THE INVENTION

The present invention relates to altitude indicators and more specifically to an altitude encoder to provide an indication of altitude as a function of a digital readout from a barometric sensor.

Altimeters for aircraft using barometric sensors have been known in the art for a number of years. In the prior art, pressure sensing devices are used to change the frequency of an oscillator the output of which is calibrated to provide an indication of altitude. Similarly it is known to use pressure sensing crystals and other pressure driven electrical pick-up devices to provide an indication of altitude.

Many altitude indicator and frequency to digital convertors are disclosed by the prior art patents such as:

| U. S. Patent | 2,008,832 |
| U. S. Patent | 2,042,490 |
| U. S. Patent | 2,498,933 |
| U. S. Patent | 2,703,386 |
| U. S. Patent | 2,745,278 |
| U. S. Patent | 2,793,360 |
| U. S. Patent | 2,840,709 |
| U. S. Patent | 2,950,471 |
| U. S. Patent | 2,958,829 |
| U. S. Patent | 3,014,210 |
| U. S. Patent | 3,127,601 |
| U. S. Patent | 3,349,390 |
| U. S. Patent | 3,445,840 |
| U. S. Patent | 3,513,708 |

U. S. Pat. No. 3,513,708 discloses an aircraft altitude indicating and reporting system comprising an altimeter electro-optical means for tracking the position of the indicator of the altimeter, means which include a register for registering the position of the indicator and providing an output corresponding to such a position, together with a second means for operatively connecting the first means to the electro-optical tracking means. The second means is effective, when the indicator moves in one direction, to operate the register to add increments of such movement and, when the indicator moves in the opposite direction, to operate the register to subtract like increments of movement. The tracking means are arranged so that they will in no way interfere with the free movement of the indicator of the altimeter. The system of this invention combines a standard aircraft altimeter together with means for reading the altimeter, which are arranged so that they will in no way disturb or change the characteristics of the altimeter.

In another prior art altimeter device, U. S. Pat. No. 2,042,490, an altimeter is disclosed wherein a master oscillator radiates a constant signal which is available for checking a ground oscillator and an aircraft oscillator. By a switching operation, the pressure actuated capacitors were removed from the circuit of the ground oscillator, which may then be exactly synchronized with the aircraft oscillator by adjusting the variable condenser. Similarly, the aircraft's operator removes the pressure actuated capacitor from the circuit and by means of a variable capacitor, adjusts the aircraft oscillator to the frequency of the master oscillator. When the pressure actuated capacitors are again connected to their respective circuits, the frequency differentials of the ground and aircraft oscillators are then due only to the difference in the capacities of the condensors, which in turn vary with the respective pressures at the positions of the two instruments. Checking against the master oscillator allows the operator to guard against frequency drift. This patent also discloses other methods of measuring beat frequency with a frequency meter in order to show altitude.

Another prior art pressure measuring device is disclosed in U. S. Pat. No. 2,745,278 in which pressure of a medium is measured by the decay time for a given decrement in vibrational amplitude of a sensing crystal which is allowed to vibrate freely in the medium. In this device, the sensing crystal is pulsed at regular intervals and its vibrational amplitude is allowed to decay. An electronic circuit is utilized to measure the elapsed time between the maximum amplitude and a selected lesser amplitude of vibration of the crystal. In doing this it is found that the work done by the oscillating crystal against the surrounding atmosphere may be in the form of energy dissipated as damping or as acoustic radiation depending upon whether the vibration is in a thickness shear mode or in extension and flexure, respectively. In this patent it is further disclosed that the ratio of the average stored energy of the crystal to the energy dissipated per cycle is a measure of the crystal Q, and varies with the air load the crystal works against. In order to obtain a sensitive indication of the pressure or density of the atmosphere surrounding the crystal it is disclosed to employ a crystal that has a minimum of loss due to internal friction and damping action contributed by the supports. Assuming now that the crystal frequency and the density of the surrounding atmosphere is such that the usual microscopic equations of motion of the viscous gas are applicable, it is shown that changes in crystal Q produced by air loading are inversely proportional to air pressure for crystals vibrating in extension and flexure, and inversely proportional to the square root of pressure for shear mode elements. Thus, the method for pressure indication disclosed by this prior art patent provides for firming mounting of the crystal at its perimeter, with the central area free to vibrate together with a means of electrically coupling the clamping place which extends over the flat surfaces of the crystal.

In yet another prior art U. S. Pat. No. 2,008,832, another device is shown in which barometric pressure is indicated by automatically rating quantities such as altitudes, in frequencies of electric oscillating circuits or by comparing frequencies governed by one altitude with other frequencies governed by a second altitude in order to determine the relative or real altitudes. It is disclosed in this patent that the atmospheric pressure variations can be utilized for automatically changing the frequency of an oscillating circuit and that the resulting change in the frequency of the circuit can be directly measured in altitude or can be measured against the frequency of a remote oscillating circuit having a predetermined frequency given by its altitude. In this device, the change in the period of an oscillating circuit resulting from air pressure variation are automatically effected by the use of a variable condenser which resembles a generalized aneroid barometer with the exception that the two oppositely arranged diaphragms of the barometer are electrically insulated from each other. Such period changes can also be obtained by coupling an aneroid barometer or battery with conventional variable condensors or, by means of specifically built vacuum tubes embodying means for automatically changing the inner electorde capacity of the tube. In comparing qualities such as altitudes the receiving and sending stations are each provided with automatically operated pressure condensors or barometer condensors. This arrangement permits the accurate comparison of the frequencies in all cases where the center station such as an airplane is close to the receiving station so that the atmospheric conditions in the locality of the two stations are practically uniform.

In addition to the prior art pressure indicating devices disclosed above, several of the above cited patents deal with various analogue to digital pulse converters. For example, U. S. Pat. No. 3,445,840 discloses an indicator apparatus which includes an analogue to digital converter which operates on the non-linear output of a transducer to provide a direction indication of the physical quantity or condition which actuates the transducer. Here, digital repetition-rate sensors actuate preset count and time base logic circuits for simulating the break points of a piecewise approximation of the characteristic curve of the transducer. This eliminates the calculations involving the characteristic curve of the transducer which are usually required to convert from the units of the electrical signal obtained from the transducer to the actual physical units being measured.

Another prior art device, U. S. Pat. No. 3,349,390 relates to a system for converting the voltage output of a non-linear transducer into a pulse group which represents a number that is substantially proportional to the physical quantity sensed by the transducer. In this device, a non-linear to pulse-count converter incorporating a linear voltage to time converter, which generates, in response to a start pulse, a delayed stop pulse time-spaced after the start pulse in proportion to the voltage to be converted. The start and stop pulses, respectively, open and close a gate connected between the ouptut of a variable frequency pulse generator in the input of a binary counter. The binary coded outputs of the counter are connected to a pulse-count detector which produces a control pulse upon sensing any of the several predetermined states of the counter's output. Each control pulse causes a change in the pulse repetition frequency of the pulse generator's output. The pulse counts and the counter at which a change is effected in the pulse frequency as well as the magnitude of those changes are parameters selected to give any desired response characteristic of the voltage to pulse-count converter. Thus, this device is useful for giving a pulse count conversion of a physical quantity monitored by a linear transducer in that the number of pulses produced will be directly proportional to the physical qunatity measured.

Yet another piror art converter is disclosed in U. S. Pat. No. 3,127,601 in which a reversable binary counter whose count is selectively increased or decreased by the output of a variable repetition rate bipolar pulse source. In turn, the repetition rate of the pulse source is controlled by the amplitude of the output of an error amplifier whose inputs are a first signal representative of the condition of the reversible counter and a second signal representative of the amplitude of the analogue message wave to be converted. Additionally, the positive or negative deviation of the output of the error amplifier from an equilibrium condition is respectively representative of which one of the first or second signals is greater than the other. This deviation is employed to control whether the positive or the negative pulse outputs of the variable repetition rate bi-polar source are passed to the input of the reversible binary counter which performs addition in response to positive pulses and subtraction in response to negative pulses.

SUMMARY OF THE INVENTION

The present invention relates to an altitude indicator using a barometric sensor to mechanically control the frequency of an oscillator which is counted and stored for readout as altitude.

More specifically, the sensor comprises an aneroid bellows which mechanically moves, during altitude changes, a core within a coil thereby changing the inductance of the coil. The coil, is in turn connected to a sense oscillator in which the output frequency of the snese oscillator is proportional to the altitude. A variable capacitor or variometer can be substituted for the core and coil as a means of changing the output frequency of the sense oscillator with altitude. The output of the sense oscillator is then combined with the output of a reference oscillator in a mixer to provide a beat frequency output signal. The beat frequency output signal is squared by a Schmitt trigger and gated through a comb mixer to a counter. Alternatively, a single sense oscillator may be fed directly to the Schmitt trigger without use of the beat frequency technique. The gate signal is produced by a gate generator for a predetermined period of time so that the count accumulated in the counter is proportional to the frequency of the signal gated to it and hence altitude. The output of the counter is suitably encoded and stored for readout and for transmission to a ground station.

Among the objects of the present invention are the provisions of an indicator to provide an altitude reading from a barometric sensor using a circuit for converting a physical quantity into a pulse signal representative of the quantity, the provision of an altitude encoder using circuitry for producing the pulse signals which are counted and stored for readout as an altitude indication.

Another object is to transmit the altitude information to a controller on the ground. This may be accomplished by radio signal through a transponder system. The code normally transmitted is the altitude code specified by the Federal Aviation Agency although any digital code may be designed into the system, if desired.

Other objects and further applicability of the present invention will become more apparent when taken from the detailed description below and the accompanying drawings.

BRIEF DESCRIPTION OF THE DRAWINGS

FIG. 1A shows an alternative sensing means embodiment.

FIG. 4 shows a top view of the altitude encoder.

DETAILED DESCRIPTION

Figure 1:
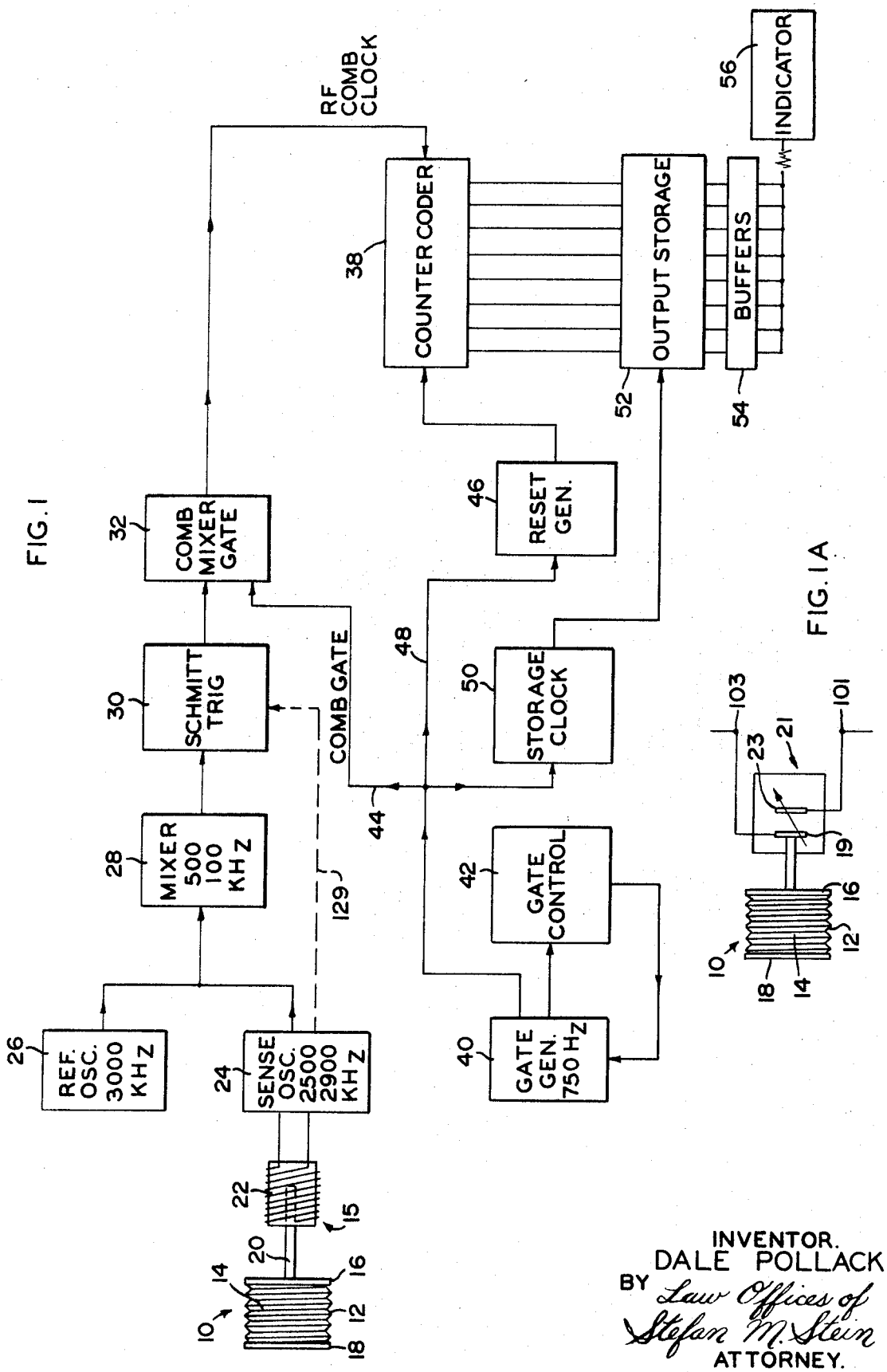
FIG. 1 is a block diagram of the altitude encoder system of the subject invention.

A typical barometric transducer 10 such as an aneroid bellows 12, having a pressure cavity 14 and rigid end plates 16 and 18, is used to sense changes in barometric pressure which vary in accordance with the altitude of an aircraft above ground. To compensation for changes in the operating characteristics of the aneroid bellows 12 due to temperatures variations, the transducer 10 includes a rocker shaft 13 and a bi-metallic linkage 17.

In one embodiment a sensing means 15 including a core 20 is mechanically coupled to the transducer 10 and is adapted to be moved by the expansion and contraction of the aneroid bellows due to changes in barometric pressure. The core 20 moves within a coil 22 and such movement results in a change of the inductance of the coil 22. The coil 22 is electrically connected to a sense oscillator 24 at junctions 101 and 103 to provide a frequency signal proportional to the barometric changes between 2,500 and 2,900 $KH_z$.

In an alternative embodiment, the core 20 and coil 22 may be replaced by a variable capacitor 21. A fixed plate 23 and a movable plate 19 of the capacitor 21 are electrically connected to the sense oscillator 24 at junctions 101 and 103. The movable plate 19 is mechanically coupled to the transducer 10 and is adapted to be moved by the expansion and contraction of the aneroid bellows due to changes in barometric pressures.

The movement of the capacitor plate 19 relative to plate 23 varies the distance separating the plates thereby changing the capacitance of capacitor 21 which in turn controls the frequency of oscillator 24.

In a third embodiment, the core 20 and coil 22 are replaced by a variometer 27. Both the fixed and the movable coils 29 and 25 respectively are electrically connected to the sense oscillator 24 at junctions 101 and 103. The movable coil 25 is mechanically coupled to the transducer 10 and is adapted to be moved by the expansion and contraction of the aneroid bellows. The movement of coil 25 relative to coil 29 changes the inductance in coil 29 which in turn controls the frequency of oscillator 24.

A reference oscillator 26 provides a reference signal of 3,000 $KH_z$. The outputs of the sense oscillator 24 and the reference oscillator 26 are fed into a standard mixer section 28 which may consist of an electron tube or semi-conductor device with suitable circuit, filter and amplifier which combines two frequencies to produce an intermediate frequency. The frequency out of mixer 28 is known as the beat frequency output signal and here is shown to range from 100–500 $KH_z$. The output of the mixer section 28 is fed into a standard squaring multivibrator 30, which is also known as a Schmitt trigger. The function of the Schmitt trigger is to provide a square or rectangular pulse output when triggered by a sine wave, sawtooth or other irregular shaped wave form. Because of the relatively fast switching action of this arrangement, the wave form of the input trigger has no effect on the output wave form so that essentially square wave output signals are always produced. This pulse output, the frequency of which is proportioned to altitude, is passed through comb mixer gate 32 and standard differentiating means (not shown) to counter coder 38.

As an alternative, a single sense oscillator 24 may be used in place of the two oscillators 24 and 26 combined to produce a beat frequency. In this embodiment, the output of the sense oscillator 24 is fed directly to the Schmitt trigger 30 as shown by line 129.

A gate generator 40 is coupled to a gate control 42. The output of the gate control 42 provides a gate signal to gate generator 40 and hence a signal to comb mixer gate 32 by line 44, reset generator 46 by line 48 and storage clock generator 50. The output of the storage clock generator is coupled to the output storage 52 in order to provide a storage clock signal. The reset generator 46 is connected to the counter coder 38. The counter coder 38 is connected to the output storage 52 which in turn is connected to the output buffers 54 and output means 56 a suitable indicator or a transponder.

Figure 2:
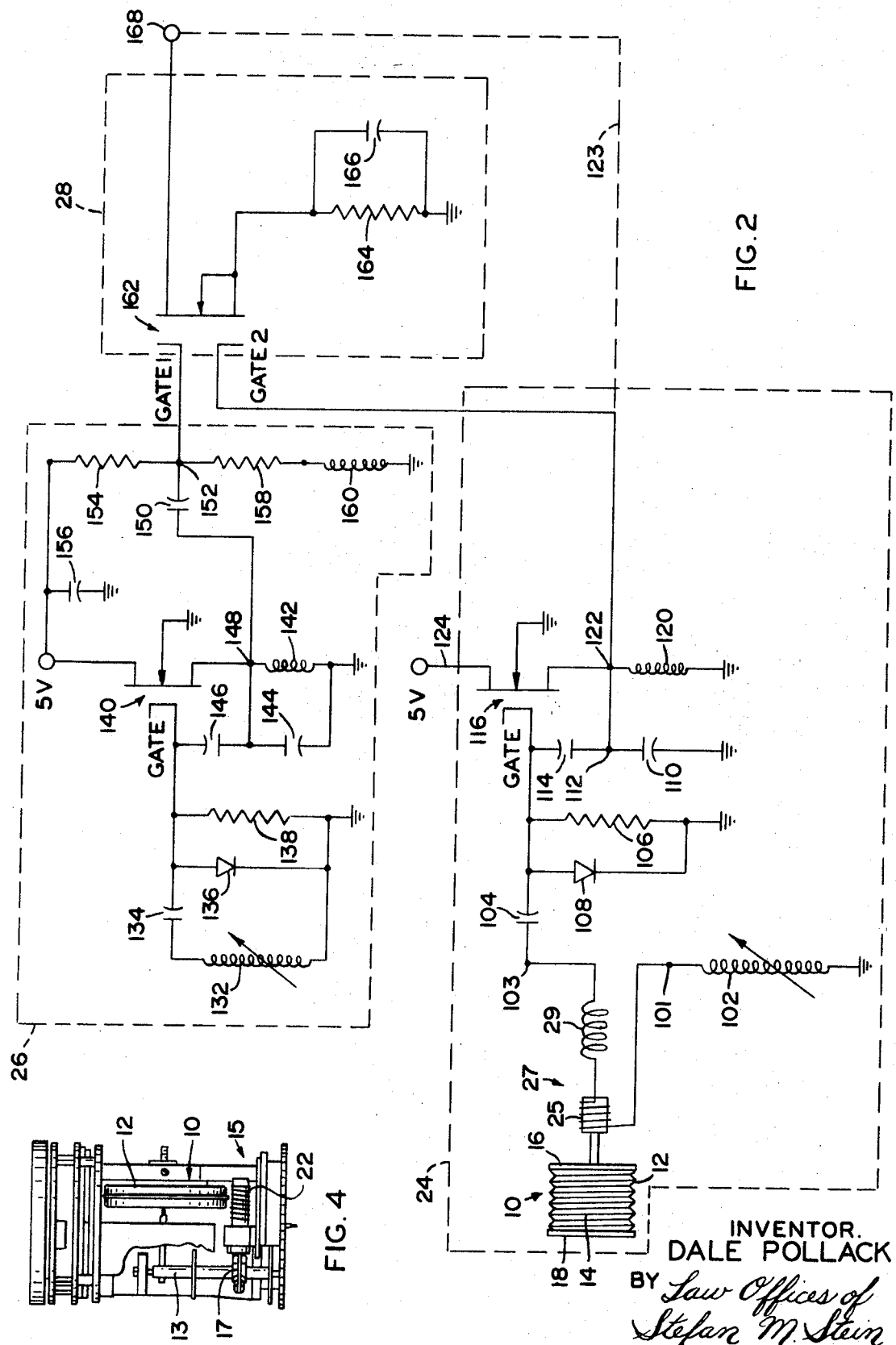
FIG. 2 is a schematic diagram of the oscillator-mixer portion of the system of FIG. 1.

The schematic diagram of the oscillator-mixer sections are shown in FIG. 2. The sense oscillator 24 includes a grounded variable inductor coil 102 which is connected at junctions 101 and 103 to the sense inductor coil 22 in the core/coil sensing means 15, to plates 19 and 23 in the variable capacitor sensing means 21 or to coils 25 and 29 in the variometer sensing means 27. A coupling capacitor 104 is coupled between the sense inductor 22 and a grounded resistor 106. A diode 108 is shunted across the resistor 106. A capacitor 110 is connected between ground and a junction 112. Capacitor 114 is connected to the gate of field effect transistor 116. A 5 volt bias is applied to the drain of transistor 116 through lead 124. A coil 120 is connected between ground and junction 122 which is also coupled to junction 112 and the source of field effect transistor 116.

The reference oscillator 26 includes a grounded circuit of a variable coil 123 and capacitor 134 is paralled with a diode 136 and resistor 138 which is connected to a gate of field effect transistor 140.

A 5 volt bias is also applied to the drain of field effect transistor 140. A tuned circuit, comprising grounded coil 142, and capacitor 144 is connected to the source of transistor 140 through capacitor 146. Capacitor 150 is connected between junction 148 and junction 152. A resistor 154 is coupled between junction 152 and the 5 volt bias, and capacitor 156 is connected between ground and the 5 volt bias. A series connection, including a coil 160 and resistor 158 is connected between ground and junction 152.

The output of sensing oscillator 24 at junction 122 and the output of reference oscillator 26 are connected to the mixer section 28 where they are combined at gate No. 1 and gate No. 2 of field effect transistor 162. The mixer 28 is provided with a grounded circuit comprising resistor 164 and capacitor 166. The mixer output is applied to junction 168.

When only a single sense oscillator 24 is used, the signal at junction 122 is fed directly to junction 168 through line 123.

Figure 3:
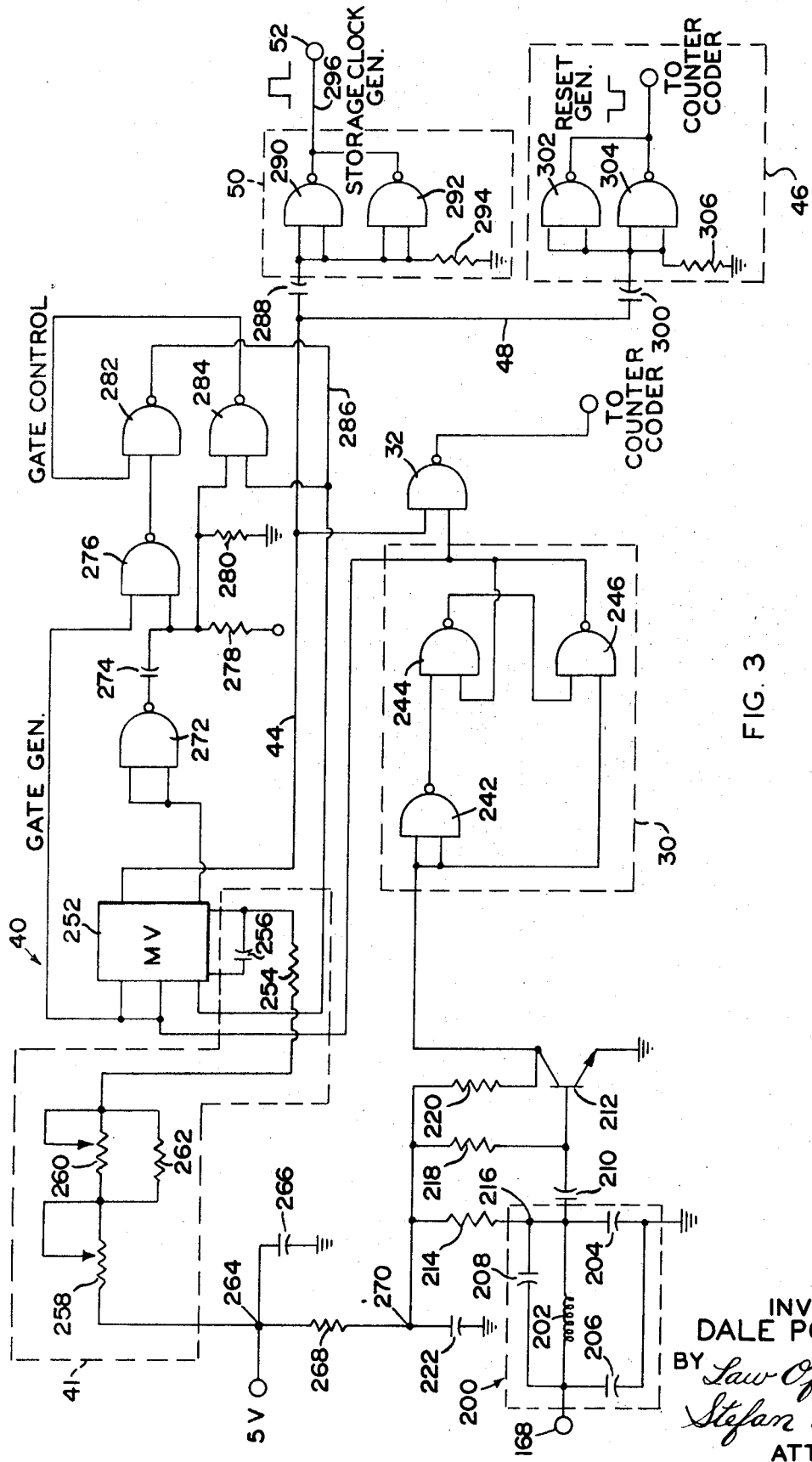
FIG. 3 is a schematic diagram of the code generating computer portion of the system of FIG. 1.

FIG. 3 illustrates the code generating computer portion of the system wherein the filtered sine wave output from junction 168 of the mixer 28 is passed through a filter 200 which consists of coil 202 and capacitors 204, 206, and 208. Capacitor 210 is then coupled between filter 200 and the base of transistor amplified 212. A resistor 214 is connected to the junction 216 of the filter, and another resistor 218 is connected between resistor 214 and the base of transistor amplifier 212. A third resistor 220 is coupled in parallel between the collector of transistor 212 and resistor 218. A capacitor, 222 is also connected between resistor 214 and ground.

The collector of transistor 212 is coupled to Schmitt trigger circuit 30 which includes gates 242, 244 and 246. The square pulse wave output of Schmitt trigger circuit 30 passes to comb generator 32 formed of a NAND gate. The output of the comb generator 32 is in turn connected to the counter coder 38 in order to provide an RF comb clock signal.

Gate generator 40 is formed of a one shot multivibrator 252, controlled by a calibration circuit 41 which includes resistor 254, capacitor 256, variable calibration potentiometer 258 and a resistor 262 placed across variable potentiometer 260 for temperature calibration purposes. Calibration potentiometer 258 is connected to junction 264 which is provided with a 5 volt bias. Capacitor 266 is connected between the ground and junction 264 and resistor 268 connects junctions 264 and 270.

One output of multivibrator 252 is connected to the input of gate 272. The output of gate 272 is then connected through a series capacitor 274 to the input of gate 276 and through a voltage divider circuit which includes resistors 278 and 280, to the input of gate 284. A direct connection is also made to gate 276 from multivibrator 252.

The output of gate 276 is then coupled to one input of gate 282 while the other input to gate 282 is drawn from the output of gate 284. The output of gate 282 is fed back to the gate generator 40 and the input of gate 284 by line 286.

One output of multivibrator 252 is also coupled to the comb generator gate 32 by line 44 while another output of multivibrator 252 is coupled to the storage clock generator 50 through capacitor 288. Storage clock generator 50 includes gates 290 and 292 and grounded resistor 294. The storage clock signal is applied to the output storage 52 through line 296.

A fourth output from the gate multivibrator 252 is applied to reset generator 46 by line 48 and coupling capacitor 300. Reset generator 46 includes gates 302 and 304 and grounded resistor 306. The output of reset generator 46 is then applied to counter 38.

In the first embodiment the operation of the system may be described as follows: The aneroid bellows 12 of the barometric transducer 10 assumes a position in accordance with the pressure within the cavity 14. The expansion and contraction rate of bellows 12 during altitude changes may vary due to temperature variations. To compensate for this distortion rocker shaft 15 and bi-metallic linkage 17 are linked between bellows 12 and core 20. Temperature changes causing the operating characteristics of bellows 12 to vary will cause a corresponding deflection in bi-metallic linkage 17 thereby compensating for the temperature effects on bellows 12. Changes in the position of the bellows 12 causes core 20, which is magnetically coupled to coil 22, to move within the coil thereby changing its inductance. The change in bias on sensing oscillator 24 produces an output signal, the frequency of which is between 2,500 and 2,900 $KH_z$ which is proportional to the position of the core as determined by the barometric pressure that is representative of altitude. The output signal of the sense oscillator is fed to mixer 28.

As previously discussed, the core/coil sensing means 15 may be replaced by a variable capacitor sensing means 21 or a variometer sensing means 27.

The constant frequency signal from the reference oscillator 26 produces an output of 3,000 $KH_z$ which is also fed to the mixer 28 and combined there to provide a beat frequency output signal. Where only a single sense oscillator 24 is used, the output signal is fed directly from junction 122 to junction 168 through line 123. This signal is passed through filter 200 and is amplified by transistor amplifier 212. The signal is then passed to Schmitt trigger circuit 30 which squares the pulses. The signal from the Schmitt trigger circuit 30 is then passed into comb mixer gate 32. A second gate signal to comb mixer gate 32 is provided by the output of the gate generator 40 which in turn is regulated by gate control 42. The output clock pulses from the comb mixer gate 32 are differentiated and supplied to the counter coder for a predetermined period of time so that the count accumulated in the counter is proportional to the frequency of the signal gated to it. Counter 38 is periodically reset by reset generator 46 which, in turn, is controlled by gate generator 40. The count signals from counter 38 are applied to output storage 52 which, in turn, is connected to the output buffers 54 and finally to a suitable indicator 56 which is calibrated to provide an indication representative of altitude. Storage clock signals are then provided by the storage clock generator 50 which is also controlled by the gate generator 40.

It will thus be seen that the objects set forth above, and those made apparent from the preceding description are efficiently attained and since certain changes may be made in the above construction without departing from the scope of the invention, it is intended that all matter contained in the above description or shown in the accompanying drawings shall be interpreted as illustrative and not in a limiting sense.

It is also understood that the following claims are intended to cover all the generic and specific features of the invention herein described, and all statements of the scope of the invention which, as a matter of language, might be said to fall therebetween.

Now that the invention has been described:

What is claimed is:

1. An altitude encoder for providing a digital output representative of altitude comprising transducer means responsive to barometric pressure, sensing means coupled to said transducer means, oscillator means responsive to said sensing means to control the frequency output thereof, wave shaping pulse generating means coupled to said oscillator means to produce a shaped pulse signal in response to said oscillator output signal, gate signal means coupled to said wave shaping pulse generating means to receive said shaped pulse signal, said gate signal means generating signals for a predetermined time period, counter means coupled to said gate signal means, said counter means generating an output signal representative of altitude, storage means coupled to said counter means for encoding the output of said counter and output means to generate a digital output signal connected to said storage means wherein said digital output provides an indication calibrated in terms of altitude.

2. The encoder of claim 1 wherein said oscillator means comprises first oscillator means responsive to said sensing means to control the frequency output thereof and a second oscillator means providing a reference signal, means to combine the signal outputs of said first and second oscillators to produce a beat frequency output signal.

3. The encoder of claim 2 further comprises a mixer and filter means whereby said outputs of said first and second oscillators are combined to produce a beat frequency output signal.

4. The encoder of claim 1 wherein said oscillator means comprises a single sense oscillator means responsive to said sensing means to control the frequency output to produce an output signal.

5. The encoder in claim 1 wherein said transducer means includes an aneroid bellows mechanically coupled to said sensing means which is in turn electrically connected to said oscillator means such that changes in barometric pressure resulting from altitude variations will cause the output frequency of said oscillator means to vary.

6. The encoder in claim 5 wherein said transducer means further comprises a compensating connector means to compensate for changes in transducer means characteristics due to changes in environmental conditions.

7. The encoder in claim 6 wherein said compensating connector means comprises a bi-metallic linkage arranged between said aneroid bellows and said sensing means.

8. The encoder in claim 1 wherein said sensing means which is mechanically coupled to said transducer means comprises a core which is electromagnetically coupled with a coil and said coil is electrically connected with said oscillator means whereby the movement of said core changes the inductance in said coil to vary the output frequency of said oscillator means.

9. The encoder in claim 1 wherein said sensing means which is mechanically coupled to said transducer means comprises a variable capacitor which is electrically connected to said oscillator means such that changes in capacitance of said variable capacitor causes the output frequency of said oscillator means to vary.

10. The encoder in claim 1 wherein said sensing means which is mechanically coupled to said transducer means comprises a variometer which is electrically connected to said oscillator means such that changes in inductance of said variometer causes the output frequency of said oscillator means to vary.

11. The encoder of claim 1 further comprising a comb mixer gate coupled between said means to produce a square wave pulse signal and said counter to gate the said pulse signal.

12. The encoder of claim 11 further comprising means for producing storage clock signals for said storage encoding means.

13. The encoder of claim 12 further comprising reset generator means to provide a reset signal for said counter whereby the count in said counter is proportional to the frequency of said pulse signal.

14. The encoder of claim 13 further comprising gate control means to control the output of said gate signal means.

15. The encoder of claim 14 wherein said gate control includes a one-shot multivibrator.

16. The encoder of claim 15 wherein said gate control means further includes means to calibrate and adjust its output.

17. The encoder of claim 1 wherein said wave shaping pulse generating means comprises a Schmitt trigger circuit to generate a square pulse signal.

18. The encoder of claim 1 wherein said output means comprises transponder means to generate transponder output signal, said transponder output signal transmitted to a remote readout means for providing an indication calibrated in terms of altitude.

* * * * *

UNITED STATES PATENT OFFICE
CERTIFICATE OF CORRECTION

Patent No. 3,750,474          Dated August 7, 1973

Inventor(s)   Dale Pollack

It is certified that error appears in the above-identified patent and that said Letters Patent are hereby corrected as shown below:

Column 4, line 16, delete "snese" and insert therefor -- sense --.

Column 10, line 21, after "trol" insert -- means --.

Signed and sealed this 20th day of November 1973.

(SEAL)
Attest:

EDWARD M. FLETCHER, JR.          RENE D. TEGTMEYER
Attesting Officer                Acting Commissioner of Patents